United States Patent

[11] 3,581,760

[72] Inventor Benjamin W. West
 237 La Espiral, Orinda, Calif. 94563
[21] Appl. No. 799,205
[22] Filed Feb. 14, 1969
[45] Patented June 1, 1971

[54] VALVE
 8 Claims, 5 Drawing Figs.
[52] U.S. Cl. .................................................... 137/115, 137/117
[51] Int. Cl. ...................................................... G05d 7/01
[50] Field of Search ........................................... 137/102, 115, 117, 118

[56] References Cited
UNITED STATES PATENTS
2,799,293 7/1957 Clay ............................ 137/117
3,311,125 3/1967 Beasley ....................... 137/117
3,500,854 3/1970 Altmeppen .................. 137/118

Primary Examiner—William F. O'Dea
Assistant Examiner—William H. Wright
Attorney—Anderson, Luedeka, Fitch, Even and Tabin ABSTRACT: A valve is described for venting a first pressure region upon the occurrence of a drop in pressure in a second pressure region. Also described is a pneumatic sensing circuit using such a valve. The valve includes a housing defining a valve chamber in which a movable closure member operates to open and close a vent passage for the first pressure region. Upon a drop in pressure of the given magnitude in the second pressure region, the closure means moves to a position wherein the vent passage is opened to relieve pressure, in the first pressure region.

PATENTED JUN 1 1971 3,581,760

INVENTOR.
BENJAMIN W. WEST
BY Anderson, Luedeka,
Fitch, Even & Tabin
ATTORNEYS

VALVE

This invention relates generally to pneumatic valves and, more particularly, to a valve for venting a first pressure region upon the occurrence of a drop in pressure of a given magnitude in a second pressure region. The valve of the invention is particularly adapted for use in certain types of pneumatic control circuitry for improving the operation of pneumatic sensing devices of the normally closed venting type by amplifying the vent signal produced thereby.

Certain types of pneumatic control circuits employ pneumatic sensing devices of the normally closed venting type to vent system pressure when a malfunction occurs. Sensing devices of this type used in pneumatic circuitry generally operate to sense variables such as oil pressure, coolant temperature, bearing temperature, vibration, overspeed, and pump pressure. When an unsafe condition occurs in any one of the sensed variables, the sensing device, which is normally closed, opens to vent a pressure region and cause a warning indicator to move to a position where a malfunction is indicated, to relay a pressure signal to another region of the system, or to do both.

Occasionally, under adverse circumstances such as excessive line lengths or system pressures, or the presence of unpredictable feedbacks, conditions may occur in a system which were not contemplated in the original design. These adverse circumstances may arise due to mistakes in design, applications of the system for purposes not originally contemplated, or where a mismatch of components exists such as may result from using components produced by different manufacturers. Without intending to limit the scope of the invention, one particular type of adverse circuit condition will be described for purposes of example. It is not to be implied from this, however, that the invention is inapplicable to other purposes.

A typical pneumatic indicating system utilizes a bias pressure to move an indicator device to a condition indicating a malfunction. This bias pressure acts against the main system pressure and is overcome by the main system pressure during normal operation. Upon venting, decay time for the vented system pressure is typically not instantaneous but occurs over a period of time. Under certain adverse conditions, explained above, the bias pressure on the indicator device may decay at a faster rate than the vented system pressure. When this happens, the net pressure forces on the indicating device cause the device to return to its original normal position. Accordingly, the source of malfunction is no longer indicated. The occurrence of a condition wherein the bias pressure decays more quickly than the vented system pressure may be caused by any of the adverse circumstances as discussed above.

One way in which irrevocable and rapid pressure venting may be provided in sensing devices to thereby ensure a fast decay of system pressure is to provide a very large valving area and stroke. Another way is to equip all sensing devices with a built-in snap action. These solutions, however, have proved relatively costly. Moreover, the addition of a large valve area or the provision of a snap action can have inherent negative affects such as excessive system pressure sensitivity or the need for large pressure differentials, both of which can produce deleterious system performance.

Accordingly, it is an object of the present invention to provide means for improving the operation of certain types of pneumatic control circuitry.

Another object of the invention is to provide an improved valve for venting a first pressure region upon the occurrence of a drop in pressure of a given magnitude in a second pressure region.

Another object of the invention is to provide a valve for improving the signal supplied by various pneumatic sensing devices of the normally closed venting type.

It is another object of the invention to provide an improved pneumatic control circuit.

Other objects of the invention will become apparent to those skilled in the art from the foregoing description, taken in connection with the accompanying drawings wherein.

Figure 1:
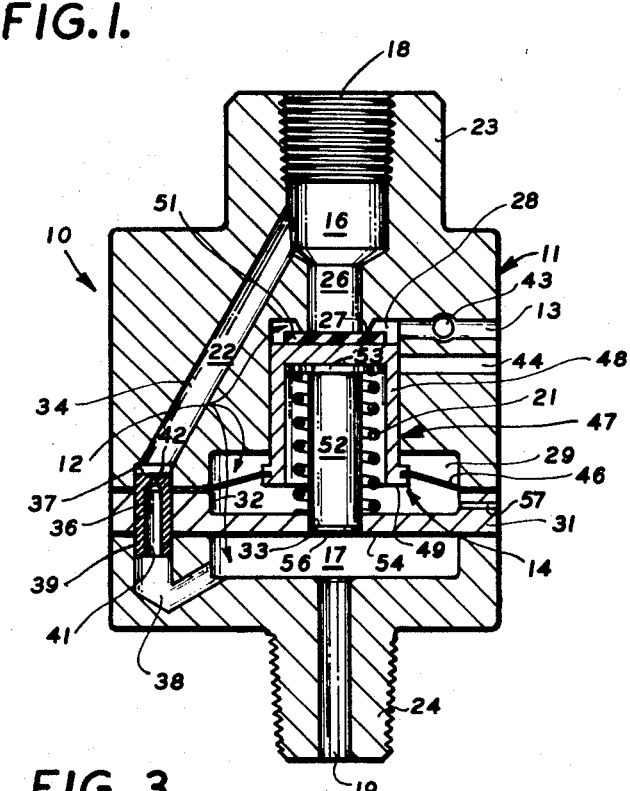
FIG. 1 is a full section view of a valve constructed in accordance with the invention.

Very generally, the valve of the invention includes a housing 11 defining a valve chamber 12. A vent passageway 13 communicates with the valve chamber. Closure means 14 are disposed within the valve chamber and form a pressure barrier between a first section 16 and a second section 17 of the valve chamber. The closure means are displaceable between a first position wherein the vent passage is effectively closed to a second position wherein the vent passage is open and communicating with the first section. A first port 18 is provided in the housing for communicating with the pressure region to be vented. A second port 19 is provided in the housing for communicating between the second section of the valve chamber and the region in which a drop in pressure is to occur. Biasing means 21 are provided for holding the closure means in the first position when the pressure differential between the first and second sections is less than a predetermined level. An equalization passage 22 is provided in the housing communicating between the first and second sections. The equalization passage has a cross section to sufficiently inhibit flow from the first section to the second section upon a drop in pressure of a given magnitude in the second section, thereby creating a pressure differential of at least the predetermined level between the first and second sections to overcome the force of the biasing means.

Referring now more particularly to the drawings, the construction of the valve of the invention is illustrated in FIG. 1. The housing 11 has a main body which is generally cylindrical in outer shape and which has a pair of cylindrical projections 23 and 24 extending therefrom in axial alignment with each other at opposite ends of the housing. The axis of the aligned projections 23 and 24 is offset slightly from the axis of the cylindrical main portion of the housing 11. The projection 23 defines the orifice 18 and is threaded internally for connection to an externally threaded line. The projection 24, which is of smaller outer diameter than the projection 23, is externally threaded and defines the orifice 19.

The housing 11 defines the internal valve chamber 12. The orifice 18 opens into the first section 16 of the valve chamber 12 and the orifice 19 opens into the second section 17 of the valve chamber 12. The valve chamber, between the two sections 16 and 17, includes a nozzle section 26, terminating in a lip 27, communicating between the section 16 and a central section 28. The central section 28 is generally cylindrical and extends from the nozzle 26 to a generally cylindrical intermediate section 29 of substantially wider diameter than the central section 28. The intermediate section 29 is separated from the second section 17 of the valve chamber 12 by a membrane support plate 31 which forms part of the housing 11. The membrane support plate 31 has a circular recess 32 therein which defines part of the intermediate section 29, and further has a round opening 33 therein extending through the plate centrally of the circular recess 32. The separable portions of the housing 11 and the plate 31 are secured together by suitable means, not illustrated.

The equalization passage 22 extends from the section 16 of the valve chamber to the section 17 thereof. The equalization passage 22 includes a diagonal section 34 extending from the section 16 to an end section 37 near the plate 32. A round hole 36 is provided in the plate 31 aligned with the end section 37 of the passage 22. The passage 22 includes a further section 38 which has a portion aligned with the hole 36 and a diagonally intersecting portion providing communication with the section 17 of the valve chamber 12. A nozzle element 39 is fitted within the opening 36 and provides an internal passage 41 between the sections 34 and 38 of the passage 32. The passage 41 is of reduced diameter, particularly at one end wherein the passage 41 of the nozzle element 39 terminates in a nozzle 42.

The vent passage 13 extends radially with respect to the valve chamber 12 communicating from the exterior of the housing to the central section 28 at the end of the central section adjacent the nozzle 26. An adjusting screw 43 is provided extending through a suitable passage, not shown, in the housing 11 so that the end of the screw extends into the vent passage 13. By adjusting the amount which the screw 43 projects into the vent passage 13, a predetermined pressure differential may be provided across the vent passage 13 under certain operating conditions, as will be explained more fully below. A further vent passage 44 is provided in the housing 11 generally parallel with the vent passage 13 and communicating between the exterior of the housing and the central section 28. The further vent passage 44 is positioned toward the second section 17 of the valve chamber 12 with respect to the vent passage 13.

The closure means 14 include a first membrane or diaphragm 46 extending transversely of the valve chamber in the intermediate section 29 thereof. The membrane 46 is clamped between the plate 31 and one portion of the housing 11 and has a central opening therein in which a piston structure 47 is supported. The piston structure 47 includes a piston 48 of generally cup-shaped configuration. The piston 48 has an outwardly projecting annular flange 49 at the open end thereof in which the membrane 46 is suitably secured at the rim of its central opening so as to form a pressure barrier. The outer diameter of the cup-shaped piston 48 is such as to mate within the cylindrical central section 28 of the valve chamber 12. The outer surface of the closed end of the piston 48 supports a disc-shaped seal 51 which engages the lip 27 of the nozzle 26. With the seal 51 in the position illustrated, the nozzle 26 is blocked, thereby effectively closing the vent passage 13 to the first section 16 of the valve chamber 12.

The piston structure 47 of the closure member 14 also includes a piston rod 52 positioned within the cup-shaped piston 48. One end of the piston rod 52 terminates in a disc-shaped flange 53 which engages the inner side of the closed end of the piston 48. The opposite end of the piston rod 52 extends into and mates within the opening 33 in the plate 31. The biasing means 21, consisting of a coil spring, is positioned between the plate 31 and the flange 53 and is under a slight compression to bias the seal 51 against the lip 27 of the nozzle 26. Completing the closure means 14 is a second membrane or diaphragm 54 which extends transversely of the valve chamber 12 on the side of the plate 31 opposite from that of the membrane 46. The membrane 54 is clamped between the plate 31 and the separable portion of the housing 11 adjacent thereto. The membrane 54 extends across the opening 33 and engages the end 56 of the piston rod 52. The membrane 54 thereby forms a second area of the piston structure facing toward the second section 17 of the valve chamber 12. A passage 57 is provided in the plate 31 for venting the space between the two membranes 46 and 56 to atmosphere.

The normal operating condition of the valve is that illustrated with the closure means in the first position, that is, that position wherein the vent passage 13 is effectively closed. This condition results when the port 19 is effectively closed and when the port 18 is coupled to a region or source of system pressure. Under these conditions, the pressure in the section 17 equalizes through the equalization passage 22 with the pressure in the section 16, the system pressure. When the pressure at the port 19 drops a given magnitude, such as, as will be explained more fully below, when a malfunction is sensed and the sensing valve opens to the vent position, a difference in pressure results between the first section 16 and the second section 17 of the valve chamber 12, due to the nozzle member 39 restricting the equalization passage 22. When the pressure differential exceeds a predetermined level, (for example 20 p.s.i.) the trip point, the closure member 14 becomes unbalanced and the pressure in the region 16 acting on the upper face of the seal 51 displaces the piston 48 downwardly in the drawing, opening the nozzle 26. This has the effect of opening the vent passage 13 to the first section 16, providing a passage for venting the system pressure. In addition to acting on the small area of the upper surface of the seal 51 within the nozzle 26, once the piston 48 is displaced downwardly, the system pressure acts on the diaphragm 46 through the clearance space between the piston 48 and the inner wall of the housing 18. The addition of the area of the diaphragm 46 upon movement of the piston results in a "snap action" affect so the valve will remain in the vented condition even though the pressure differential between the sections 16 and 17 is less than the predetermined level.

As long as the system pressure is higher than the bias pressure provided by the spring 21, the valve remains in the open condition to allow venting through the vent passage 13. When a desired fall-off in system pressure has occurred to a level, for example of about 1 p.s.i. above the venting pressure (the venting pressure being typically atmospheric pressure), the spring bias is selected to close the valve once again. In order to maintain the pressure in the section 16 above a desired value, the adjusting screw 43 is moved in and out to create an appropriate pressure drop across the passage 13. When the pressure rises again so that the differential between sections 16 and 17 exceeds the predetermined level, the piston 48 moves downwardly against the spring 21 and exhausts the excess pressure approximately in proportion to that pressure. As long as the port 19 is vented or open, a tendency for an excessive rise in pressure in the system will be prevented by repeated cycling of the closure member 14.

If the orifice 19 is effectively closed, such as by the sensing valve closing as will be explained below, the valve of the invention allows the system to be repressurized up to supply pressure potential. This is because, once the closure member cycles to a closed position, system pressure will build until the predetermined level of pressure differential between sections 16 and 17 is exceeded. All the time, however, some pressure buildup is occurring in section 17 through the equalization passage 22. Thus, even though the closure member may recycle to the open condition, the higher pressure in the region 17 will cause the valve to close before the pressure in the region 16 approaches atmospheric, allowing a step-by-step pressure buildup.

Although not limited thereto, one practical form of the invention is designed for a trip point or predetermined pressure differential between sections 16 and 17 of about 20 p.s.i. The trip level is determined by the relation of the area of the nozzle 26 to the force of the spring 21. With a 5/32-inch nozzle diameter, a spring force of about 5 oz. is satisfactory. The level of pressure differential at which the closure member 14 will return to the closed position is best determined empirically by trial and error selection of effective diameters for the diaphragm 46. A satisfactory ratio of trip level pressure differential to the differential at which closing takes place is 10 to 1. This may be obtained by an effective diameter of eleven-sixteenths inch for the diaphragm 46. In the above example, the diameter of the nozzle 42 is 0.008 inch.

Figure 2:
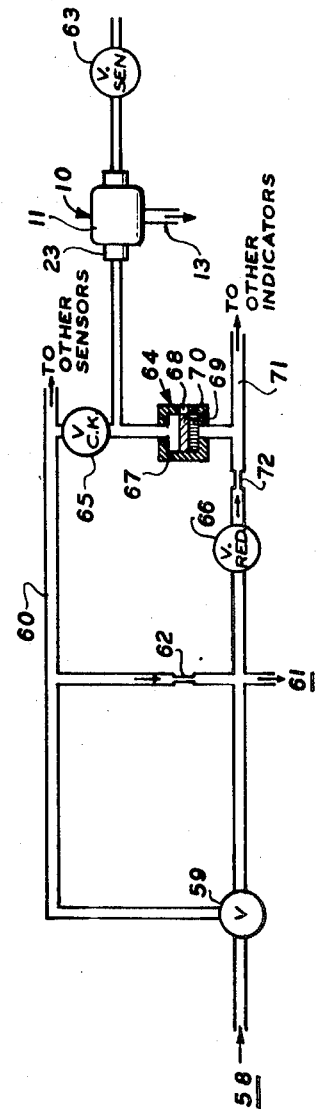
FIG. 2 is a diagrammatical view of a portion of a pneumatic circuit using the valve of the invention.

Referring now to FIG. 2, a portion of a pneumatic circuit in which the valve 10 of the invention may be used is illustrated. System supply pressure at 58 is supplied normally through a three-way or relief valve 59 to the system being operated, indicated generally at 61. The valve 59 is connected to a vent line 60, but during normal operation is closed to this line. The valve 59, which acts as a shutdown relay, is self-clamped by an orifice feedback connection 62 from the vent line 60 to the system side of the valve. A sensing valve 63 is connected to the vent line 60 through the valve 10 of the invention and through a check valve 65. Other sensing valves, not shown, may also be connected to the line 60 in a similar manner, that is, through a valve of the invention and a check valve. An indicating device 64 is connected between the valve 10 and the system pressure through a pressure reduction valve 66 and an orifice 72. The indicating device 64 includes a suitable housing 67 having a window 68 therein and an internal movable flag consisting of a red portion 69 and a green portion 70. Under normal operating conditions, with both of the valve 10 and the sensing valve 63 closed, the reduction valve 66 produces a lower pressure in the line 71, causing the flag of the indicating device 64 to be in the illustrated position, with the green portion 70 showing through the window 68. For other sensing valves, other indicators, not shown, may be connected in a similar manner between the appropriate check valve and the line 71.

Assuming for a moment that the valve 10 is not present in the illustrated system, when a malfunction is sensed, the sensing valve 63 opens. This causes the pressure in the vent line 60 to drop. The reduction in the line 60 causes the three-way valve 59 to switch to the alternate condition closing off the system supply pressure at 58 and venting the system pressure at 61 through the check valve 65 and the sensing valve 63. The orifice 72 maintains the bias pressure in the line 71 at a level such that the flag moves so that the red portion 69 shows in the window 68. The other check valves corresponding to the check valve 65 prevent the other indicators, not shown, from indicating a malfunction when their sensors are unvented.

Figure 3:
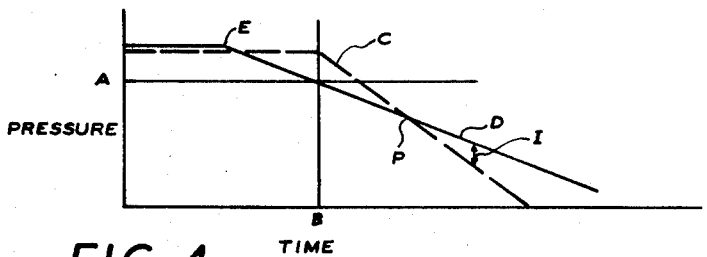
FIG. 3 is a graph illustrating variation in pressure with time in certain portions of a pneumatic circuit which results in problems which the invention solves.

Under some circumstances, the system pressure at 61 may decay more slowly than the bias pressure in the line 71. This is indicated in FIG. 3 wherein line A represents the pressure trip level of the relief valve 59, line B indicates the time at which the tripping of the relief valve occurs, line C indicates the bias pressure on the indicator 64 and line D indicates the system pressure vented through the sensor 63. FIG. 3 illustrates a problem caused by slow opening of the sensor valve 63 due to adverse circumstances in the sensing system such as excessive line lengths, unusual system pressures and unpredictable feedbacks. As previously mentioned, irrevocable rapid pressure venting of sufficient magnitude to vent the system quickly may be costly to provide and may result in negative effects such as excessive system pressure sensitivity and large pressure differentials. At point E, a malfunction is sensed and the sensor valve 63 opens. Its decay, indicated by the line E, is at a generally linear rate. At time B, the relief valve 59 vents to shut down the system pressure signal to the region 61. At this point, the bias pressure begins to decay through the reduction valve 66. This is indicated by the line C. At point P, it may be seen that the bias pressure drops to a lower value than the pressure in the line 60. The pressure difference I results in a return of the indicating element of the indicating device 64 to the illustrated position, with the green portion 70 in the window 68. As a result, the indicator fails to show the cause of the shutdown. Although one indicator only is shown in the system of FIG. 2, it is to be understood that several such indicators, as mentioned above, are typically used. The other indicators are locked in the normal or green condition due to the venting of the bias pressure through the valve 66.

Figure 4:
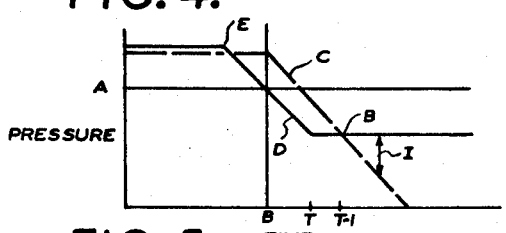
FIG. 4 is a graph similar to FIG. 3 illustrating a further type of pressure variation with time in a pneumatic system which can create problems which the invention solves.

Referring now to FIG. 4, another manifestation of system difficulty which is prevented by the invention is illustrated. In the case illustrated in FIG. 4, the problem may, for example, relate to a sensed variable such as speed. If a motor overspeeds giving a shutdown signal at time E, the sensing valve 63 opens, causing a decline in the pressure in the line 60 until time B at pressure level A, at which time the relief valve 59 opens and the bias pressure C begins to decay. The motor therefore begins to slow down, since system pressure is cut off. Under some circumstances, however, slowdown of the motor can cause reinstatement of the sensor valve 63, thereby preventing further bleed down of system pressure. This is indicated by the levelling off of the line B which occurs at time T. At time $T_1$, the bias pressure T, which continues to decay, passes the system pressure at point P, resulting in a reverse bias increment I and return of the sensor to the green condition.

Figure 5:
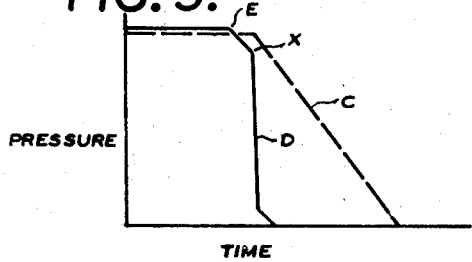
FIG. 5 is a graph illustrating the variation in pressure with time in portions of a pneumatic circuit incorporating the invention.

In accordance with the invention, the valve 10 is placed in the line prior to the sensing valve 63. For best results, the valve 10 should be placed as close as possible to the sensing valve 63 so that the volume of the pressurized region between the two items is minimized. The valve 10 provides a snap action which rapidly vents the system pressure to a very low level, having the effect of amplifying the vent signal produced by opening or venting of the sensing valve 63. The valve 10 vents the line 60 directly, by passing the sensing valve. The results of the inclusion of the valve 10 in the circuit are illustrated in FIG. 5. At point E, the sensor valve 63 vents, causing a reduction in system pressure. At point X, the valve 10 opens, rapidly venting the system signal to a very low level and ensuring that the decaying bias pressure C is constantly higher than the pressure in the line 72. As may be seen, after the point X, the venting is independent of the sensor 63 and, therefore, slow opening of the sensor does not affect operation of the indicator 64. Normal operation is restored only after the sensing valve is reset to the closed position and system pressure is allowed to build up at opposite regions. This may be accomplished by manual closure of the sensing valve 63 to allow the pressure in the sections 16 and 17 of the valve chamber 12 to equalize at the system pressure as above described.

It may therefore be seen that the invention provides a valve which improves the signal supplied by various pneumatic sensing devices of the normally closed venting type. The valve provides a snap acting exhaust when triggered by a slight venting of the sensing valve to thereby avoid problems created by slow changes of the sensed variable due to very gradual opening of the sensing valve. The valve of the invention also maintains the vented condition of the signal until pressure has been reduced to a desired level above atmospheric pressure. If the sensing valve is open, the valve of the invention alternately allows pressure build up to a desired level and then vents, repeating this cycle until the sensing valve is closed. Accordingly, the valve of the invention supplies sharply defined on-off signals for rapid response in pneumatic circuits. Moreover, the invention provides an improved sensing circuit for use in connection with pneumatic control circuitry wherein problems caused by poor design characteristics are eliminated.

Various modifications of the invention in addition to those shown and described herein will become apparent to those skilled in the art from the foregoing description and accompanying drawings. Such modifications are intended to fall within the scope of the appended claims.

What I claim is:

1. A valve for venting a first pressure region upon the occurrence of a drop in pressure of a given magnitude in a second pressure region, comprising, a housing defining a valve chamber, a vent passage communicating with said valve chamber, closure means disposed within said valve chamber and forming a pressure barrier between first and second sections of said valve chamber, said closure means being displaceable between a first position wherein said vent passage is effectively closed to a second position wherein said vent passage is open and communicating with said first section, a first port in said housing for communicating between said first section of said chamber and the first pressure region, a second port in said housing for communicating between said second section of said chamber and the second pressure region, biasing means for holding said closure means in the first position when the pressure differential between said first and second sections is less than a predetermined level, and an equalization passage in said housing communicating between said first and second sections, said equalization passage having a cross section to sufficiently inhibit flow from said first section to said second section upon a drop in pressure of the given magnitude in the second pressure region as to create a pressure differential of at least the predetermined magnitude between said first and second sections and overcome the force of said biasing means.

2. A valve according to claim 1 wherein said closure means comprise at least one membrane extending transversely of said valve chamber between said first and second sections thereof, and a piston structure supported by said membrane, said piston structure having a first area facing on said first section and a second area facing towards said second section.

3. A valve according to claim 2 wherein said first section includes a nozzle portion between said orifice and said vent passage, and wherein said piston structure includes a seal member for closing said nozzle portion when said closure means are in said first position to thereby effectively close said vent passage.

4. A valve according to claim 2 wherein a further vent passage is provided generally parallel with said first-named vent passage, said further vent passage being positioned to be opened after said first-named vent passage upon movement of said closure means from said first position to said second position, and closed before closure of said first-named vent passage upon movement of said closure means from said second position to said first position.

5. A valve according to claim 2 wherein said closure means comprise a further membrane extending transversely of said valve chamber between said first and second sections thereof and facing on said second section of said valve chamber, said further membrane engaging said second area of said piston, and wherein means are provided for venting the space between said membrane and said further membrane.

6. A valve according to claim 2 wherein said piston structure blocks said membrane from said first section when in said first position and does not when in said second position, whereby the area of said diaphragm is added to said first area of said piston in said second position to hold said vent passage open even though the pressure differential between said first and second sections is less than the predetermined magnitude.

7. A valve according to claim 6 wherein means are provided for producing a second predetermined pressure differential across said vent passage upon a rise in pressure in said first section above the vent pressure, and wherein said biasing means are selected to displace said closure means to the first position when the pressure differential between said first and second sections has become about equal to the second predetermined pressure differential.

8. A valve according to claim 7 wherein the first area of said piston, the effective area of said membranes, and the force of said biasing means are selected to provide a ratio of the first predetermined pressure differential to the second predetermined pressure differential of about 10 to 1.